(12) United States Patent
Lin

(10) Patent No.: US 8,047,124 B2
(45) Date of Patent: Nov. 1, 2011

(54) AUTOMATIC BEVERAGE MAKER

(75) Inventor: Yu-Yuan Lin, Tainan (TW)

(73) Assignee: Uni-Splendor Corp., Tainan (TW)

( * ) Notice: Subject to any disclaimer, the term of this patent is extended or adjusted under 35 U.S.C. 154(b) by 485 days.

(21) Appl. No.: 12/369,053

(22) Filed: Feb. 11, 2009

(65) Prior Publication Data

US 2010/0199848 A1     Aug. 12, 2010

(51) Int. Cl.
*A47J 31/42*      (2006.01)
*A47J 31/02*      (2006.01)

(52) U.S. Cl. .......................... 99/286; 99/289 R; 99/316

(58) Field of Classification Search .................... 99/279, 99/280, 285, 286, 289 R, 300, 304, 316, 317
See application file for complete search history.

(56) References Cited

U.S. PATENT DOCUMENTS

| | | | | |
|---|---|---|---|---|
| 5,511,465 A * | 4/1996 | Friedrich et al. | ................. | 99/286 |
| 5,676,041 A * | 10/1997 | Glucksman et al. | ............ | 99/286 |
| 5,845,561 A * | 12/1998 | Chigira et al. | .................. | 99/286 |
| 6,612,224 B2 * | 9/2003 | Mercier et al. | .................. | 99/282 |
| 6,827,002 B1 | 12/2004 | Lin | | |
| 7,533,602 B2 * | 5/2009 | Fukushima et al. | ............ | 99/286 |

* cited by examiner

*Primary Examiner* — Kien Nguyen
(74) *Attorney, Agent, or Firm* — Alan Kamrath; Kamrath & Associates PA

(57) ABSTRACT

An automatic beverage maker is provided. The automatic beverage maker is configured for storing raw materials of various hot drinks in vacuum, grinding the raw material of a hot drink to be made into powder with a grinding module, displacing an inlet cover at an upper end of a steeping chamber with a translational transport module so as to introduce the powder of the raw material of the hot drink to be made into the steeping chamber, and guiding hot boiled water in an internal water tank to drip into the steeping chamber, thus forming a convenient hot drink making mechanism.

3 Claims, 11 Drawing Sheets

AUTOMATIC BEVERAGE MAKER

BACKGROUND OF THE INVENTION

1. Technical Field

The present invention relates to an automatic beverage maker configured essentially for storing raw materials of various hot drinks in vacuum, grinding the raw material of a hot drink to be made into powder with a grinding module, displacing an inlet cover at an upper end of a steeping chamber with a translational transport module so as to introduce the powder of the raw material of the hot drink to be made into the steeping chamber, and guiding hot boiled water in an internal water tank to drip into the steeping chamber, thus forming a convenient hot drink making mechanism.

2. Description of Related Art

Nowadays, beverage making mechanisms designed for grinding raw materials of various hot drinks and making such hot drinks are available in a variety of configurations. Ideally, a beverage making mechanism is configured to bring convenience to general users in grinding the raw materials of hot drinks to be made into powder, and guide hot boiled water in the beverage making mechanism to the powder so as to make a tasty hot drink. For example, a coffee maker is disclosed in U.S. Pat. No. 6,827,002 B1, which is titled "AUTOMATIC COFFEE MAKER WITH GRINDING DEVICE" and issued on Dec. 7, 2004. According to this patented coffee maker, coffee beans are loaded into a containing hopper at a top end of the coffee maker and then ground into powder. In addition, a fineness adjusting mechanism is provided for setting fineness of the coffee powder. When an electromagnetic valve is released, the ground coffee powder drives a covering plate to cover a powder outlet. Meanwhile, boiling water flows through a water outlet tube under the covering plate and drips onto a filter cup, thereby infusing the coffee powder contained therein and producing coffee liquid by the drip-brew method. The covering plate also prevents water vapor from moving up and wetting the containing hopper. Thus, when put to practical use, the coffee maker not only allows flexible adjustment of powder fineness, but also provides automatic and convenient coffee brewing.

BRIEF SUMMARY OF THE INVENTION

The present invention provides a beverage making mechanism having a novel configuration based on the existing beverage making mechanisms for grinding raw materials of various hot drinks and making such hot drinks. It is intended that the beverage making mechanism of the present invention is capable of storing raw materials of various hot drinks in vacuum, grinding the raw material of a hot drink to be made into powder with a grinding module, displacing an inlet cover at an upper end of a steeping chamber with a translational transport module so as to introduce the powder of the raw material of the hot drink to be made into the steeping chamber, and guiding hot boiled water in an internal water tank to drip into the steeping chamber, thus forming a convenient hot drink making mechanism.

A primary objective of the present invention is to provide an automatic beverage maker having a beverage making mechanism comprising a grinding module for grinding the raw material of a hot drink to be made into powder. The grinding module comprises a supporting seat installed at an end of a main body of the beverage making mechanism. The supporting seat has an end formed as a receiving portion having a predetermined area. The receiving portion has a surface formed with a discharge opening. A limit switch is assembled at an outer portion of the supporting seat. A connecting element is coupled to an upper end of the supporting seat for allowing a containing unit containing the raw material of the hot drink to be stably screwed in place. A power motor is assembled at a lower end of the main body of the beverage making mechanism and has a protruding shaft coupled with a lower grinding element. Above the lower grinding element, a base plate is screwed into the connecting element and has an end coupled with an upper grinding element. The base plate has an upper section fitted with a container body. An anti-block element is installed in the container body while a lid covers an upper end of the container body. The raw material of the hot drink is placed in the container body and, upon activation of the power motor, is ground into powder by the upper and lower grinding elements.

The powder thus formed for making the hot drink is carried by a translational transport module into a steeping chamber. The translational transport module comprises a guide tube fitted to the receiving portion of the supporting seat installed on the main body of the beverage making mechanism. The guide tube has a bottom assembled with an arcuate rack seat and a distal end formed with a through hole fastened with a transparent window. The arcuate rack seat is driven by a gear coupled to a shaft of another power motor assembled to the main body of the beverage making mechanism such that the guide tube is driven in unison to rotate along the supporting seat. When rotated to an upper end of the steeping chamber, the guide tube pushes aside an inlet cover at the upper end of the steeping chamber. Thus, the guide tube which now has an end corresponding in position to the discharge opening of the supporting seat introduces the powder for making the hot drink into an inlet of the steeping chamber. On the other hand, hot boiled water is guided from an internal water tank to drip into the powder in the steeping chamber for making the hot drink. Thus, a convenient hot drink making mechanism is formed.

A second objective of the present invention is to provide the foregoing automatic beverage maker, wherein a vacuum pumping unit is assembled to the main body of the beverage making mechanism so that when a box storing the raw materials of various hot drinks to be made is placed into a side of the main body of the beverage making mechanism, the vacuum pumping unit evacuates air from inside the box so as to store the raw materials of the hot drinks in vacuum.

A third objective of the present invention is to provide the foregoing automatic beverage maker, wherein a top lid seat is coupled to a top of the main body of the beverage making mechanism for making various hot drinks. The top lid seat is formed with a plurality of through holes each having a predetermined area. The top lid seat has an end pivotally provided with a top lid having a bottom assembled with a guide chute. The guide chute is configured to guide hot boiled water out of the internal water tank at a side of the main body of the beverage making mechanism. A guide chute cover is movably coupled to an end of a connecting element pivotally provided at a lower end of the top lid. The guide chute, which has an end formed with an inlet tube section and an opposite end extended downward with an outlet tube section, is coupled with the guide chute cover as one piece. A steam outlet is assembled to the guide chute cover and corresponds in position to the outlet tube section of the guide chute. During use, the inlet tube section at the end of the guide chute assembled to the top lid is connected with a hot boiled water outlet extended from an upper end of the internal water tank of the beverage making mechanism so that hot boiled water is introduced through the outlet tube section of the guide chute into a corresponding water inlet of the steeping chamber to make a hot drink. When the top lid is lifted up, the guide chute is driven accordingly to disengage from the hot water outlet at the upper end of the internal water tank of the beverage making mechanism.

A fourth objective of the present invention is to provide the foregoing automatic beverage maker, wherein after the inlet cover at the upper end of the steeping chamber assembled to the main body of the beverage making mechanism is pushed aside by the guide tube so as to introduce the powder of the raw material of the hot drink to be made, a torsion spring assembled to the inlet cover at the upper end of the steeping chamber exerts a restoring force to move the inlet cover back in place so that the inlet cover closes the inlet of steeping chamber again.

BRIEF DESCRIPTION OF THE SEVERAL VIEWS OF THE DRAWINGS

The invention as well as a preferred mode of use, further objectives and advantages thereof will be best understood by referring to the following detailed description of an illustrative embodiment in conjunction with the accompanying drawings, wherein.

DETAILED DESCRIPTION OF THE INVENTION

Figure 1:
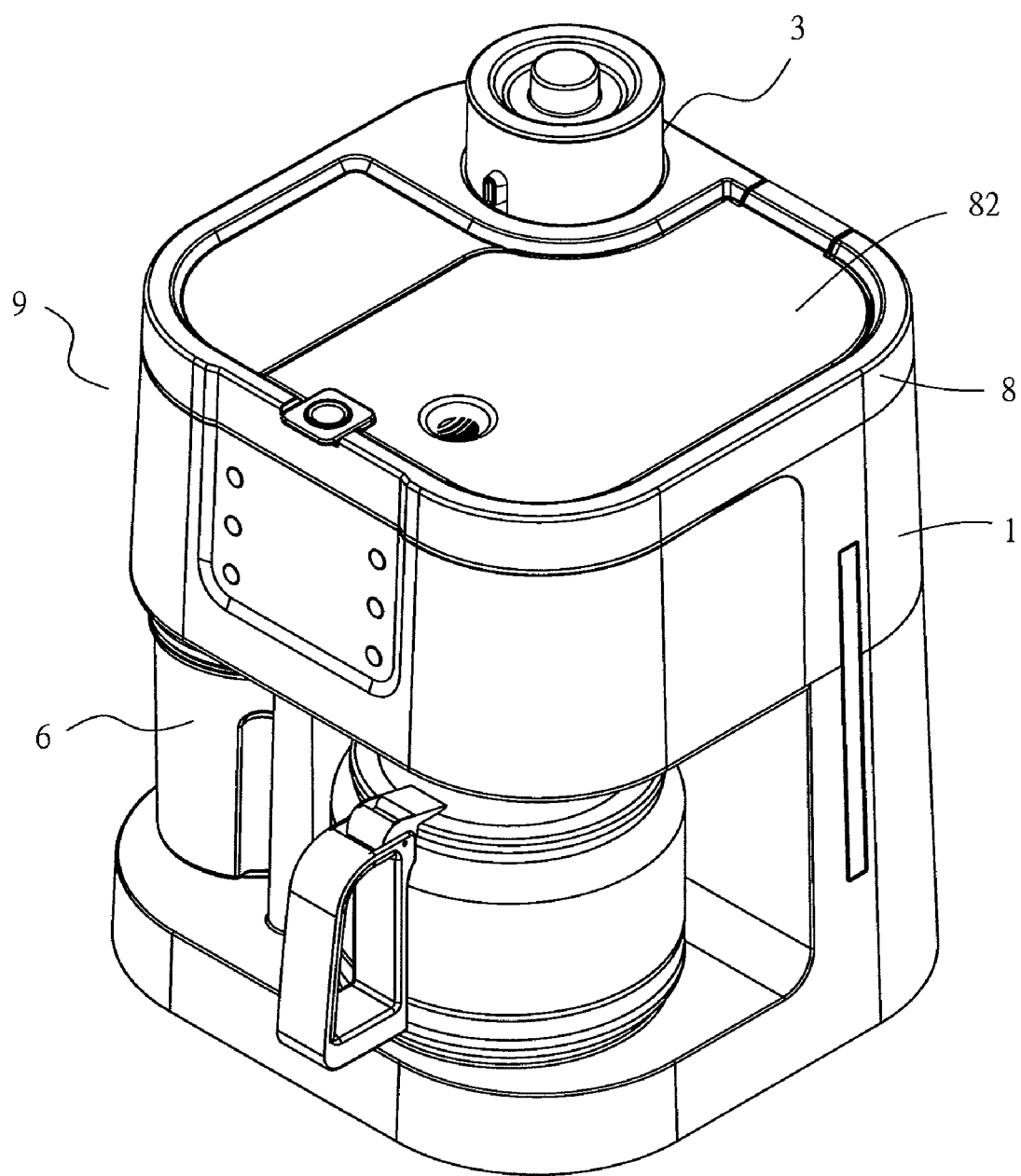
FIG. 1 is a perspective view of a beverage making mechanism according to the present invention.
Figure 2:
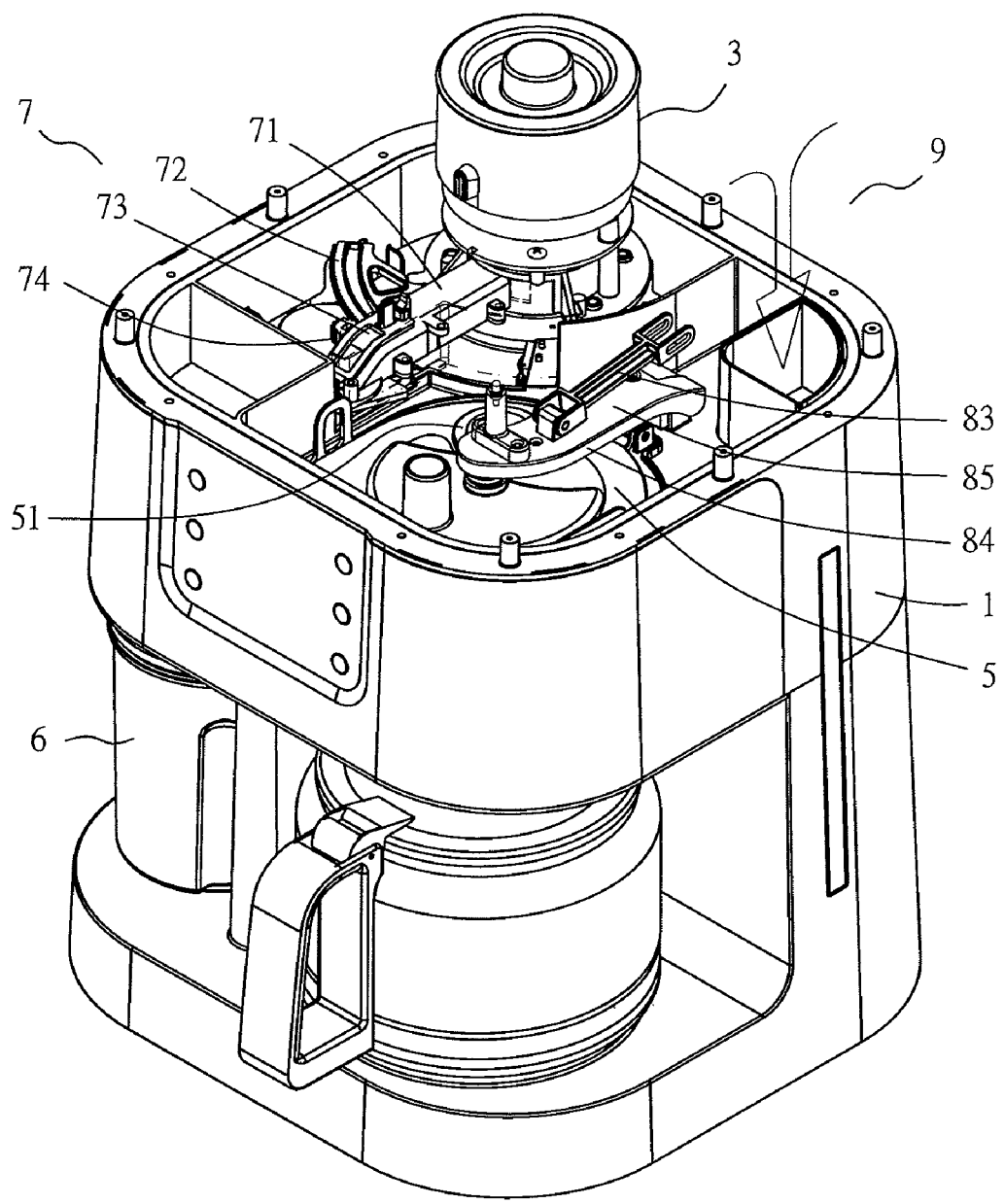
FIG. 2 is another perspective view of the beverage making mechanism according to the present invention, wherein a top lid is removed.

Referring to FIGS. 1 through 11, an automatic beverage maker according to the present invention essentially comprises a beverage making mechanism 9 for making various hot drinks. The beverage making mechanism 9 comprises a main body 1 in which a vacuum pumping unit 2, a grinding module 3, an internal water tank 4, and a steeping chamber 5 are assembled.

Figure 11:
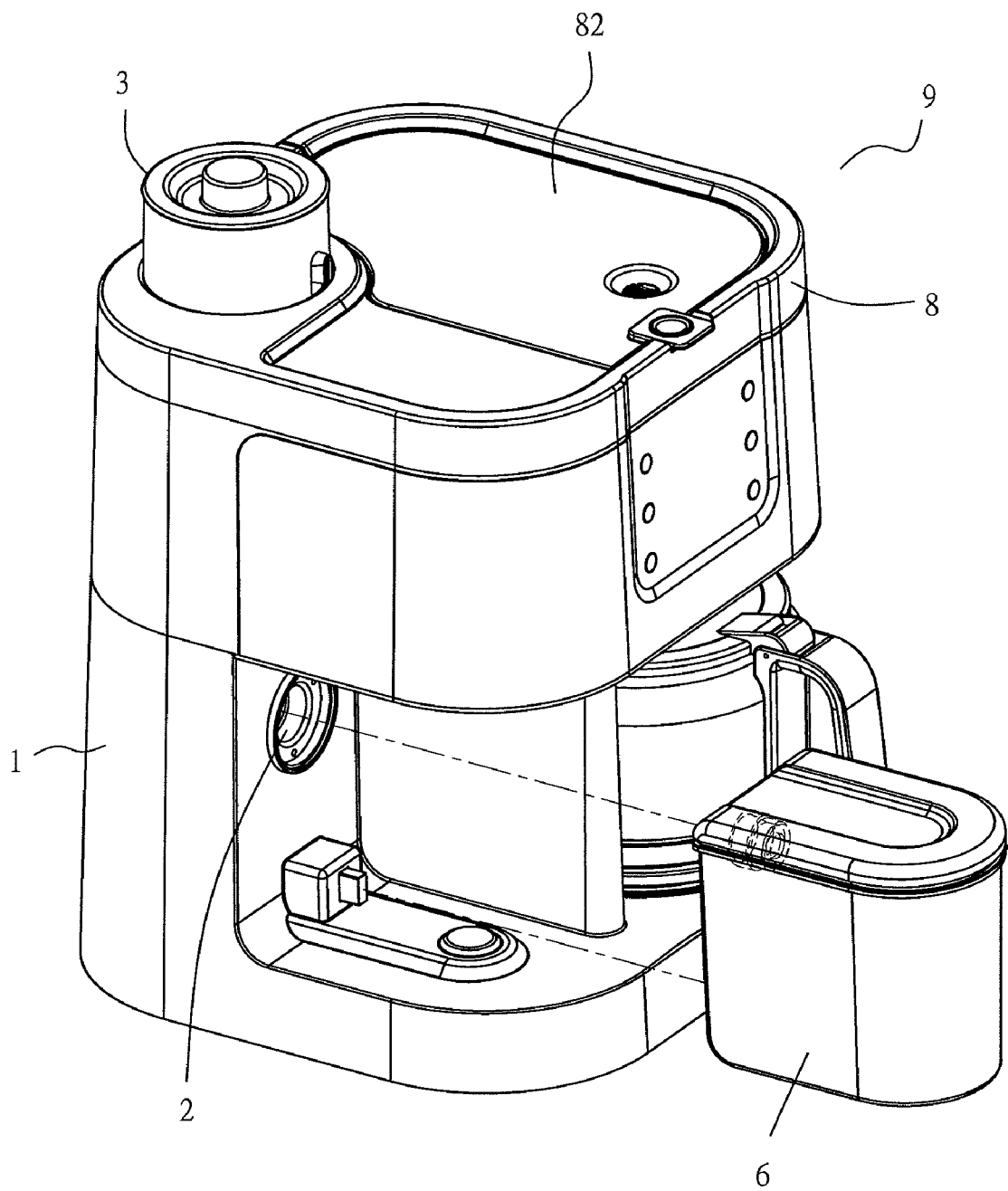
FIG. 11 is yet another perspective view of the beverage making mechanism according to the present invention, wherein a box is to be coupled with a vacuum pumping unit.

As shown in FIG. 11, a box 6 for storing raw materials of various hot drinks to be made is placed into a side of the main body 1 of the beverage making mechanism 9 so that the vacuum pumping unit 2 evacuates air from inside the box 6. Thus, the raw materials of the hot drinks are stored in vacuum when not in use.

Figure 4:
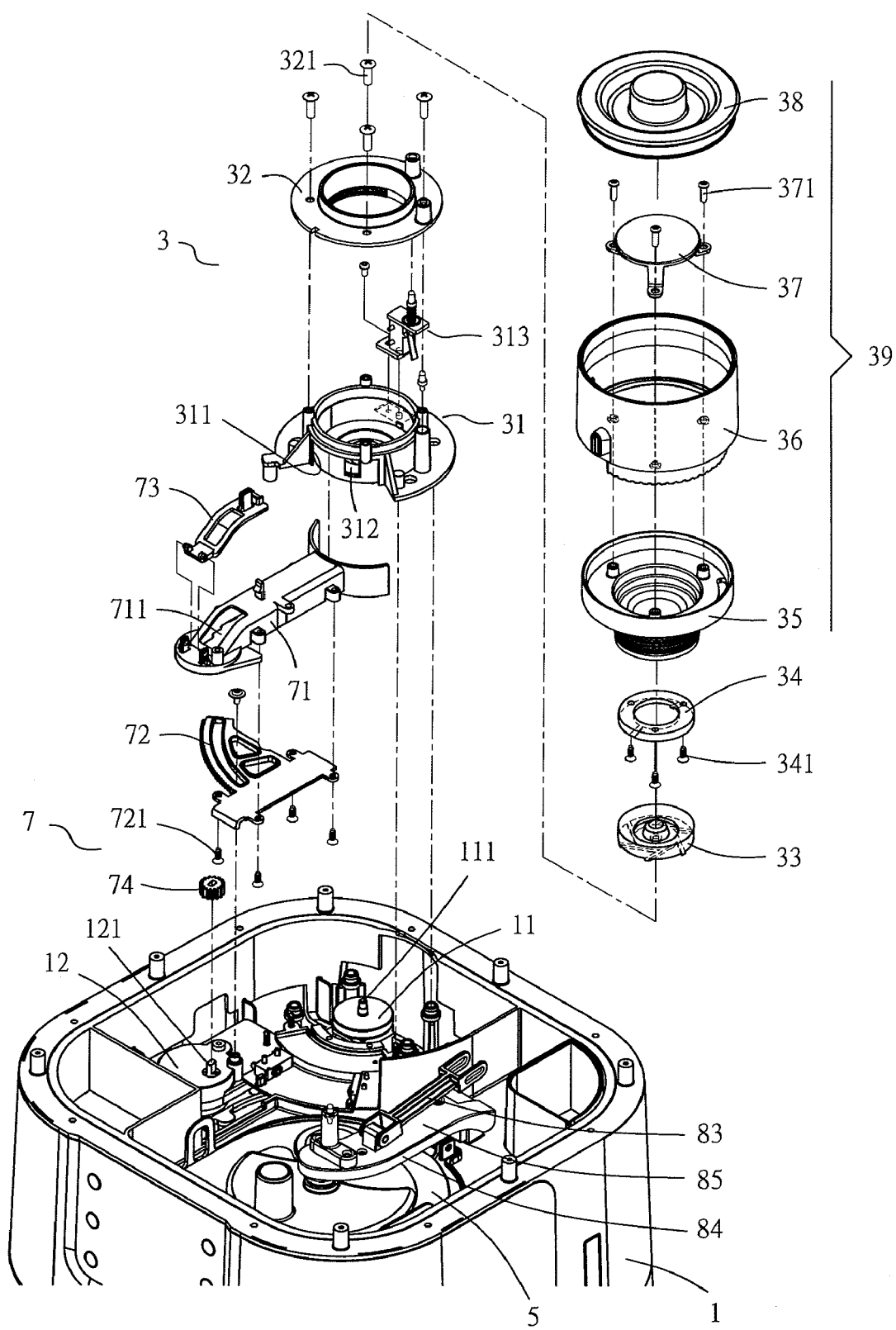
FIG. 4 is an exploded view of a grinding module and a translational transport module of the beverage making mechanism according to the present invention.
Figure 9:
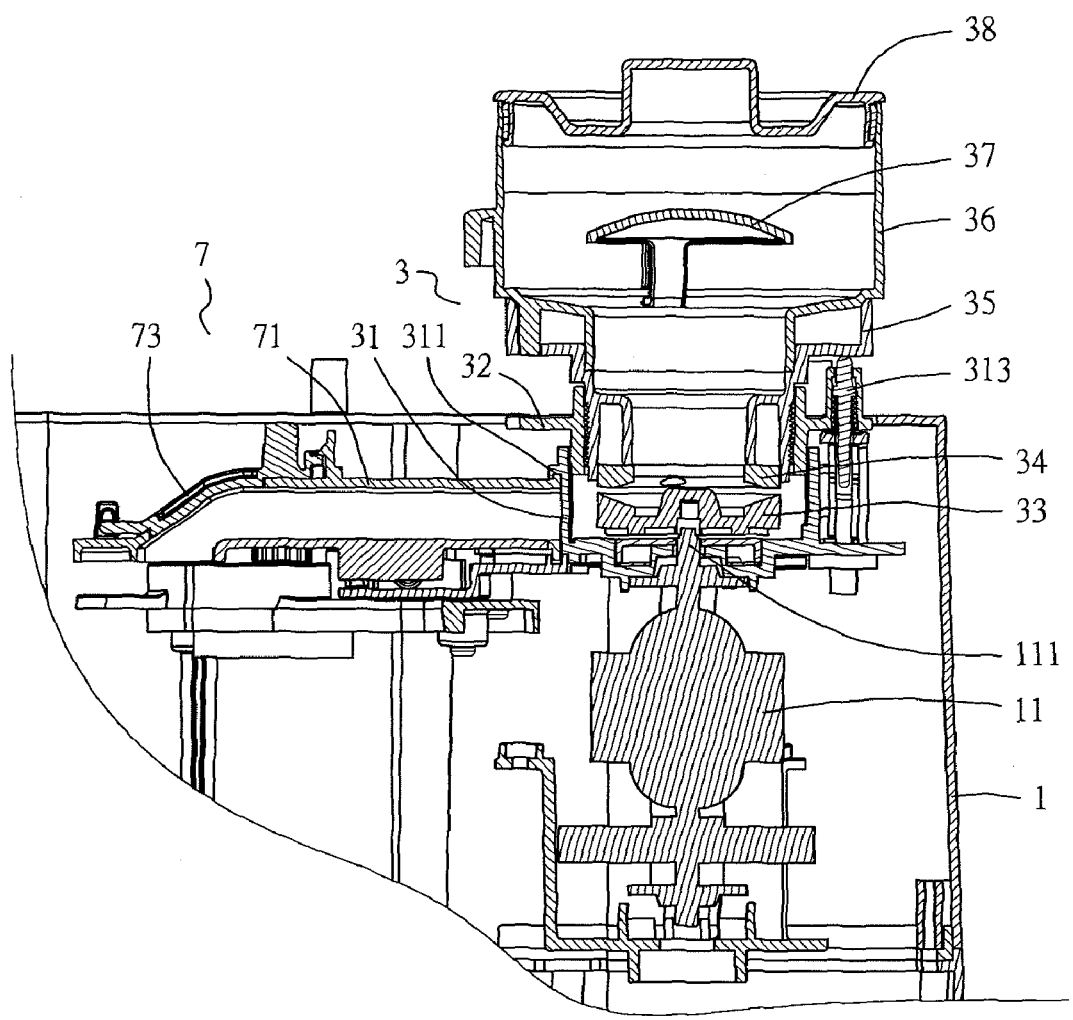
FIG. 9 is a sectional view taken along line 90-90 of FIG. 8.

The raw material of a hot drink to be made is ground into powder by the grinding module 3. As shown in FIG. 4 and 9, the grinding module 3 comprises a supporting seat 31 installed at an end of the main body 1 of the beverage making mechanism 9. The supporting seat 31 has an end formed as a receiving portion 311 having a predetermined area. The receiving portion 311 has a surface formed with a discharge opening 312. A limit switch 313 is assembled at an outer portion of the supporting seat 31. A connecting element 32 is coupled to an upper end of the supporting seat 31 by a plurality of threaded fasteners 321, thus allowing a containing unit 39 containing the raw material of the hot drink to be stably screwed in place. A power motor 11 is assembled at a lower end of the main body 1 of the beverage making mechanism 9 and has a protruding shaft 111 coupled with a lower grinding element 33. Above the lower grinding element 33, a base plate 35 is screwed into the connecting element 32 and has an end coupled with an upper grinding element 34 by threaded fasteners 341. The base plate 35 has an upper section fitted with a container body 36. An anti-block element 37 is installed in the container body 36 by means of threaded fasteners 371. The container body 36 has an upper end covered by a lid 38. The raw material of the hot drink is placed in the container body 36 and, when the power motor 11 is activated, ground into powder by the upper grinding element 34 and the lower grinding element 33.

Figure 3A:
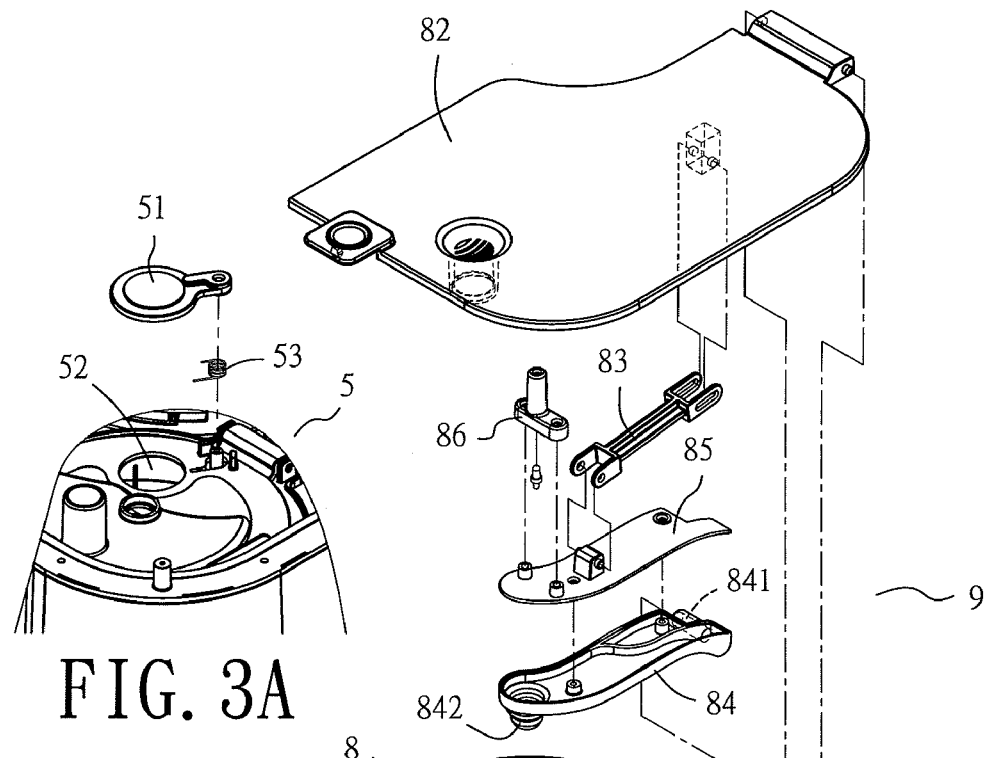
FIG. 3A is an enlarged exploded view of area A of FIG. 3.
Figure 8:
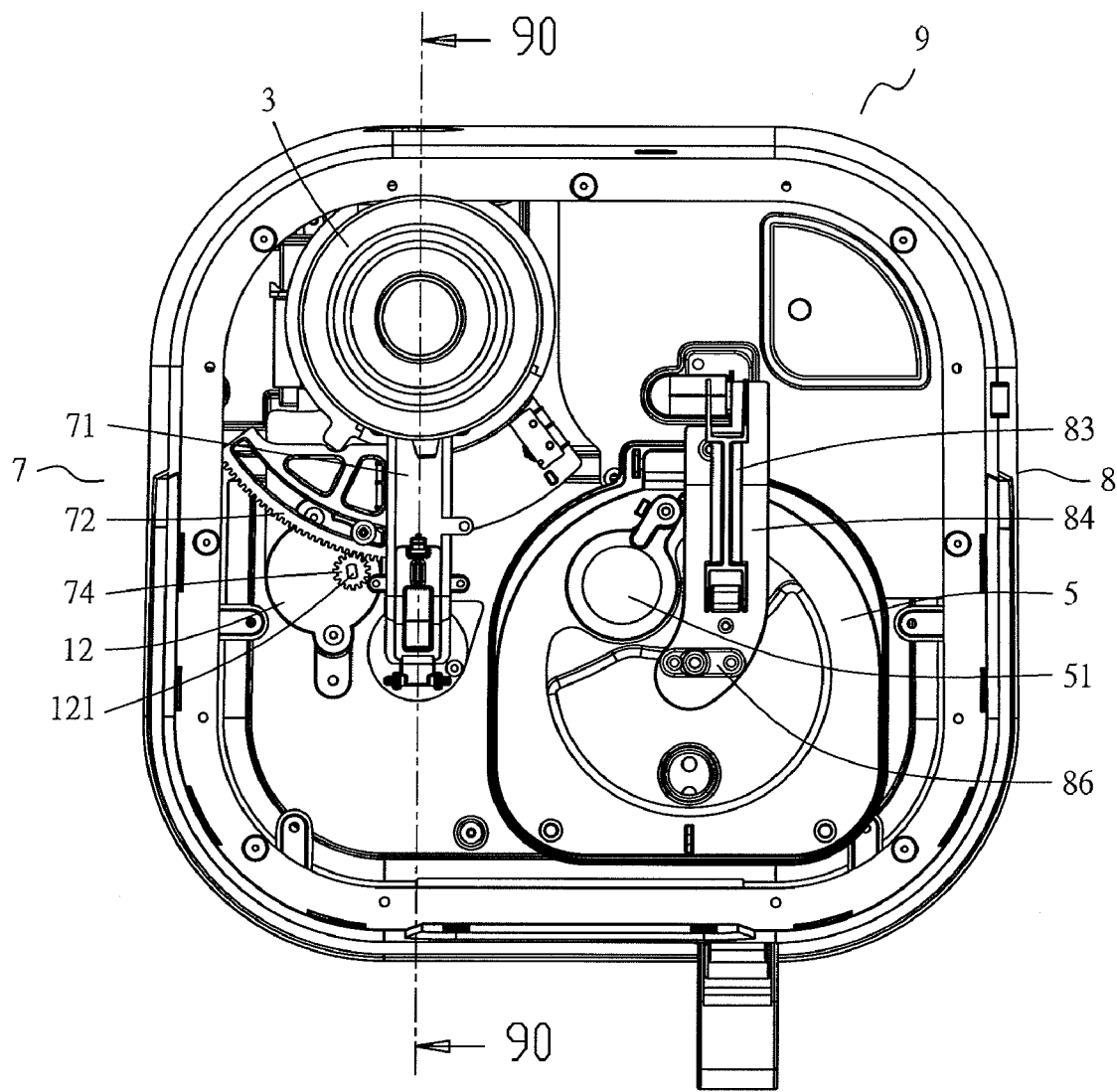
FIG. 8 is a top view of the translational transport module of the beverage making mechanism according to the present invention, wherein the translational transport module is not activated.
Figure 10:
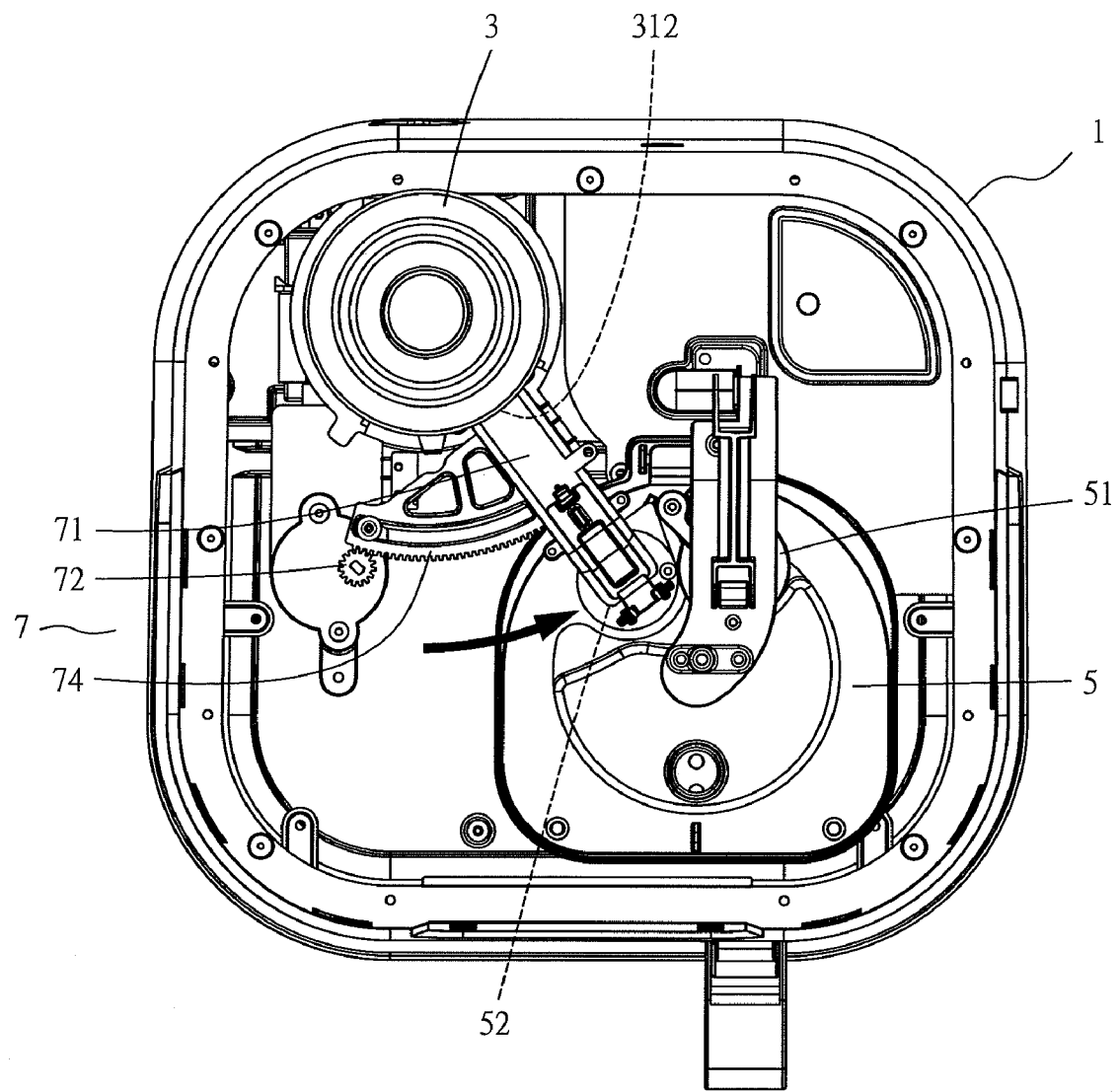
FIG. 10 shows operation of the translational transport module of the beverage making mechanism according to the present invention.

The resultant powder for making the hot drink is carried by a translational transport module 7 into the steeping chamber 5, as shown in FIG. 8. Referring to FIGS. 4 and 9, the translational transport module 7 comprises a guide tube 71 fitted to the receiving portion 311 of the supporting seat 31 installed on the main body 1 of the beverage making mechanism 9. The guide tube 71 has a bottom assembled with an arcuate rack seat 72 by a plurality of threaded fasteners 721. The guide tube 71 further has a distal end formed with a through hole 711 fastened with a transparent window 73. The arcuate rack seat 72 is driven by a gear 74 coupled to a shaft 121 of another power motor 12 assembled to the main body 1 of the beverage making mechanism 9, as shown in FIG. 8, such that the guide tube 71 is driven in unison to rotate along the supporting seat 31. When rotated to an upper end of the steeping chamber 5, the guide tube 71 pushes aside an inlet cover 51 at the upper end of the steeping chamber 5, as shown in FIG. 10. Thus, the guide tube 71 which now has an end corresponding in position to the discharge opening 312 of the supporting seat 31 introduces the powder for making the hot drink into an inlet 52 of the steeping chamber 5. After the inlet cover 51 at the upper end of the steeping chamber 5 is pushed aside by the guide tube 71 so as to introduce the powder of the material of the hot drink to be made, a torsion spring 53 assembled to the inlet cover 51 at the upper end of the steeping chamber 5, as shown in FIGS. 3 and 3A, exerts a restoring force to move the inlet cover 51 back in place so that the inlet cover 51 closes the inlet 52 of steeping chamber 5 again.

Figure 3:
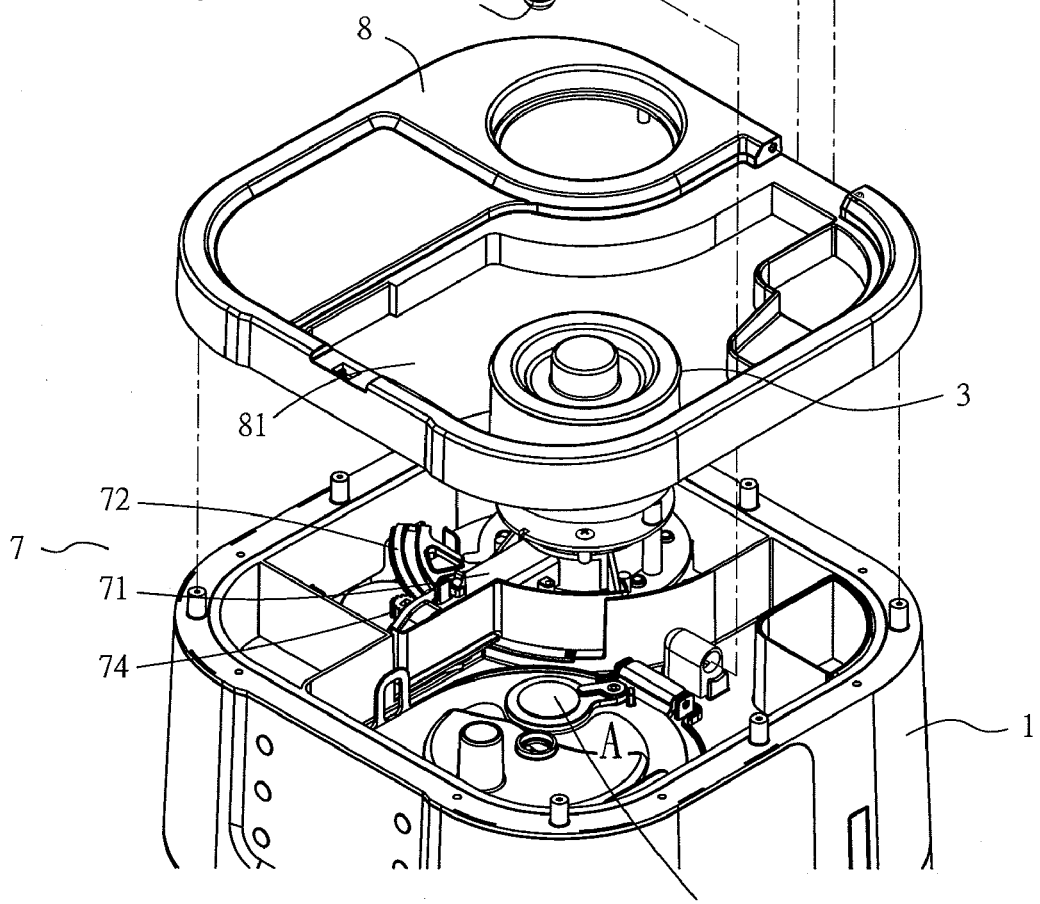
FIG. 3 is an exploded perspective view of a top lid assembly of the beverage making mechanism according to the present invention.
Figure 5:
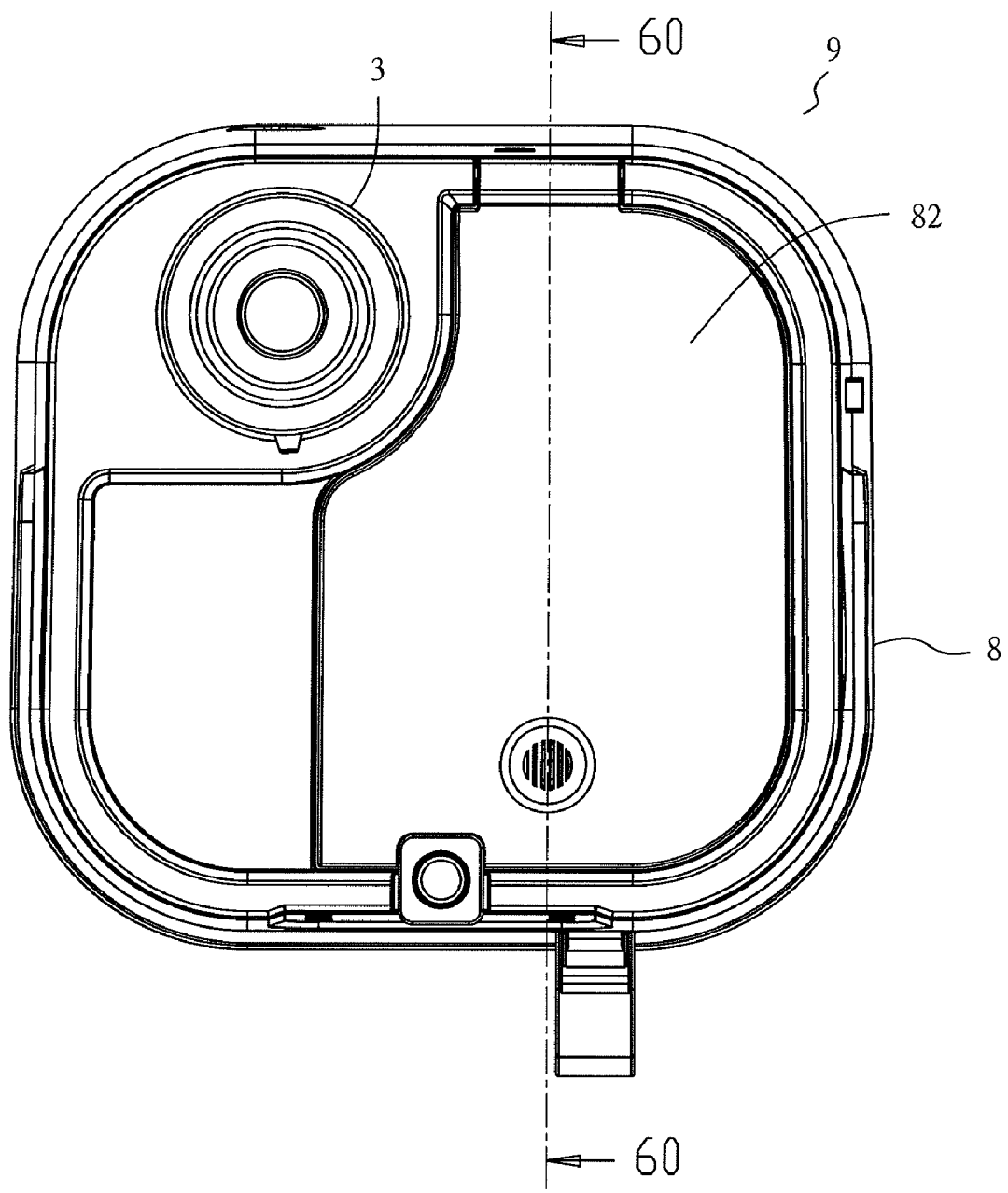
FIG. 5 is a top view of the beverage making mechanism according to the present invention.
Figure 6:
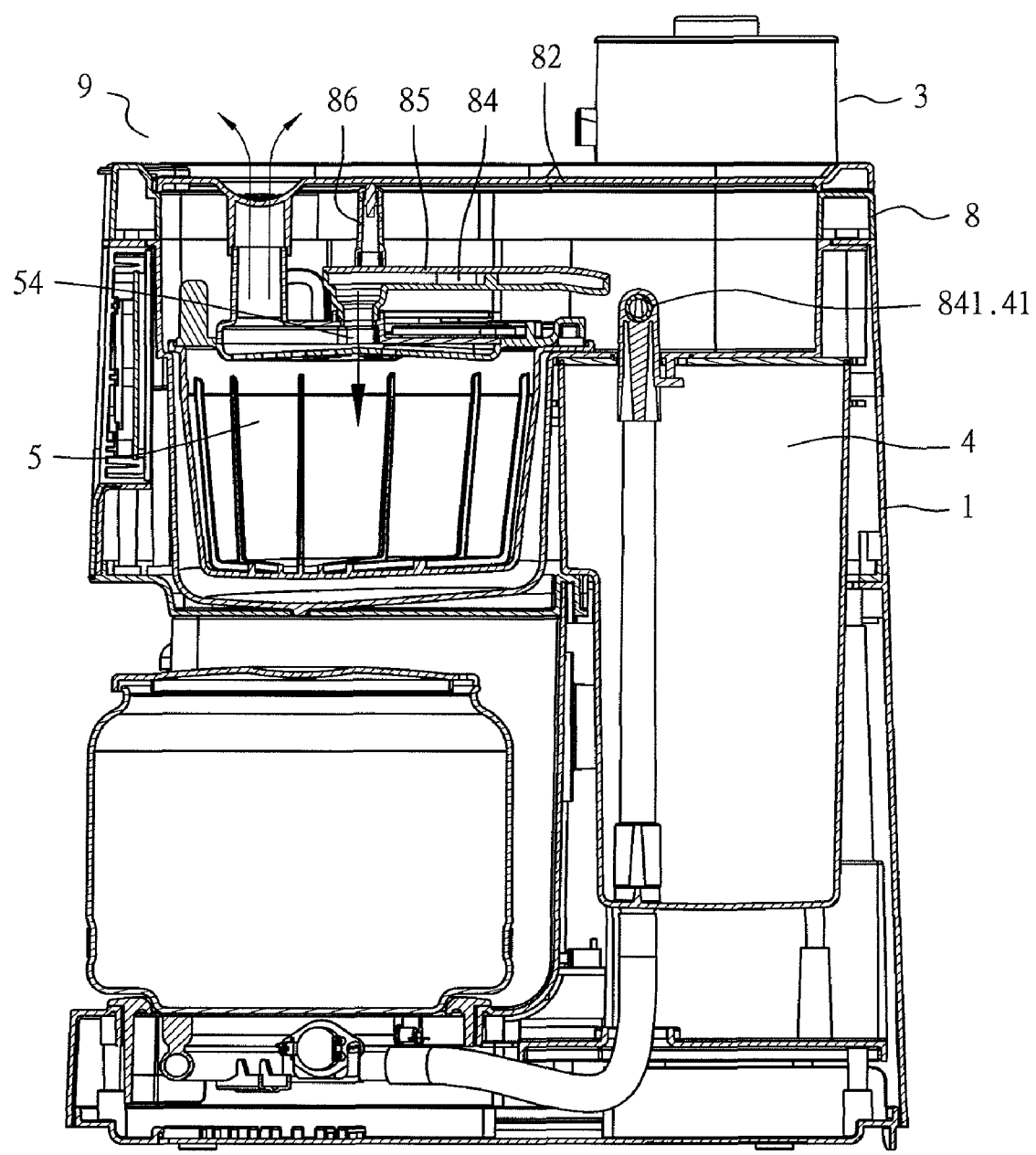
FIG. 6 is a sectional view taken along line 60-60 of FIG. 5.
Figure 7:
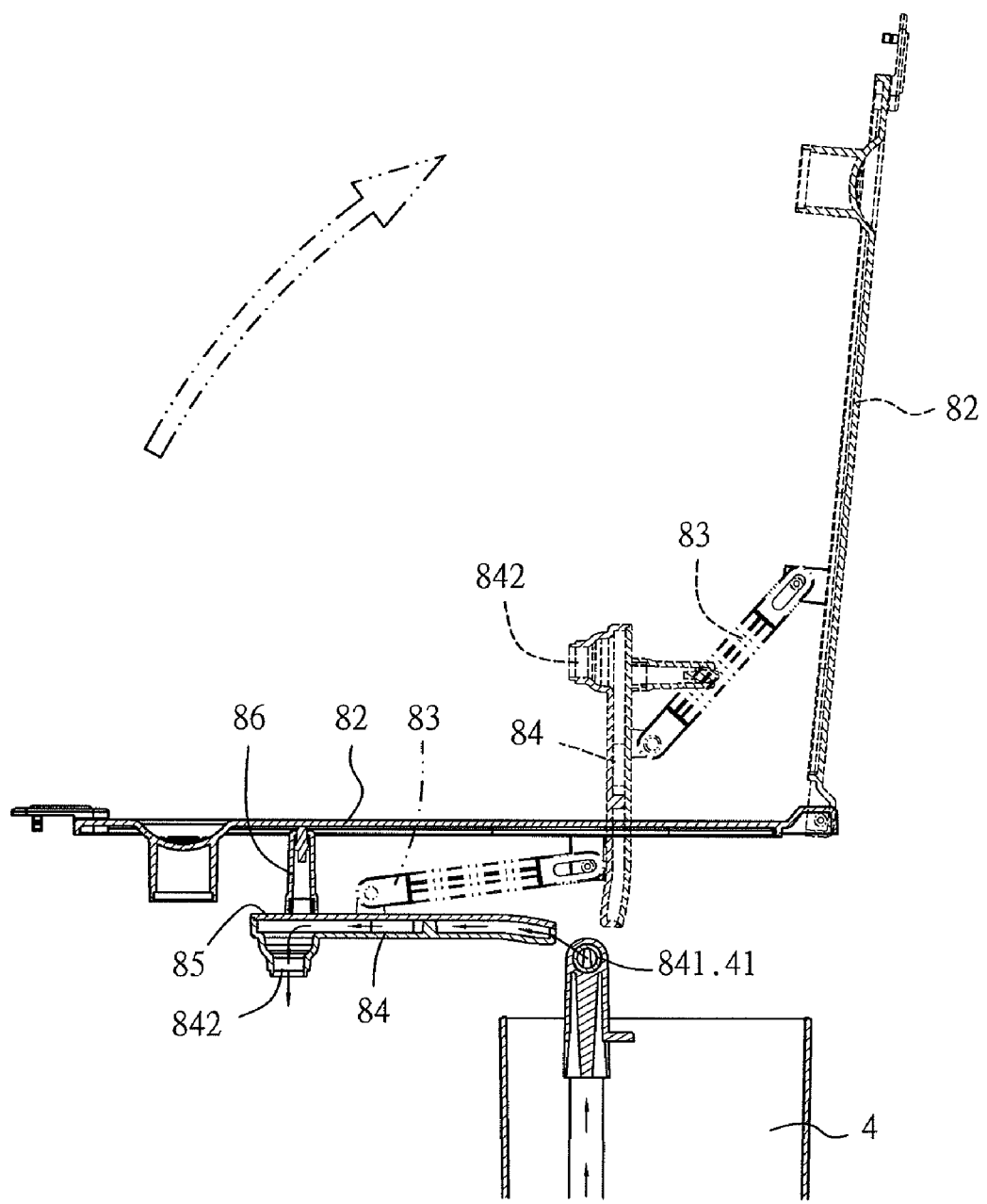
FIG. 7 illustrates how a top lid of the beverage making mechanism according to the present invention is lifted up.

Referring to FIG. 3, a top lid seat 8 is coupled to a top of the main body 1 of the beverage making mechanism 9. The top lid seat 8 is formed with a plurality of through holes 81 each having a predetermined area. The top lid seat 8 has an end pivotally provided with a top lid 82 having a bottom assembled with a guide chute 84. The top lid 82 is shown in FIG. 5 and FIG. 7 (solid lines) as assuming a horizontal position. Referring to FIG. 6, the guide chute 84 is configured to guide hot boiled water out of the internal water tank 4 located at a side of the main body 1 of the beverage making mechanism 9. A guide chute cover 85 is movably coupled to an end of a connecting element 83 pivotally provided at a lower end of the top lid 82. The guide chute 84, which has an end formed with an inlet tube section 841 and an opposite end extended downward with an outlet tube section 842, is coupled with the guide chute cover 85 as one piece, as shown in FIG. 7. Referring to FIG. 3, a steam outlet 86 is assembled to the guide chute cover 85 and corresponds in position to the outlet tube section 842 of the guide chute 84. During use, as shown in FIG. 6, the inlet tube section 841 at the end of the guide chute 84 assembled to the top lid 82 is connected with a hot boiled water outlet 41 extended from an upper end of the internal water tank 4 of the beverage making mechanism 9 so that hot boiled water is guided through the outlet tube section 842 of the guide chute 84 into a corresponding water inlet 54 of the steeping chamber 5 so as to make the hot drink. When the top lid 82 is lifted up, as shown by the dashed lines of FIG. 7, to fill tap water into the internal water tank 4 (indicated by the downward arrow of FIG. 2), the outlet tube section 842 of the guide chute 84 is moved along with the top lid 82 so as to be away from the water inlet 54 at the upper end of the steeping chamber 5 of the beverage making mechanism 9.

Referring to FIG. 9, when it is desired to use the beverage making mechanism 9 to perform the preset hot drink making process, the raw material of a hot drink is poured into the grinding module 3 in the main body 1 so as to be ground into powder. The arcuate rack seat 72 is driven to rotate by the gear 74 coupled to the shaft 121 of the power motor 12 assembled to an end of the main body 1, as shown in FIG. 10, so that the guide tube 71 is driven in unison to rotate along the supporting seat 31. When rotated to the upper end of the steeping chamber 5, the guide tube 71 pushes aside the inlet cover 51 at the upper end of the steeping chamber 5. As a result, the end of the guide tube 71 corresponds in position to the discharge opening 312 of the supporting seat 31 and guides the powder for making the hot drink into the inlet 52 of the steeping chamber 5. In addition, as shown in FIG. 6, the guide chute 84 assembled to an end of the top lid 82 guides hot boiled water in the internal water tank 4 to drip into the powder in the steeping chamber 5 for making the hot drink. Thus, a convenient hot drink making mechanism is formed.

The invention claimed is:

1. An automatic beverage maker, essentially comprising a beverage making mechanism for making various hot drinks, the beverage making mechanism comprising a main body assembled with an internal water tank, the main body being additionally assembled therein with a steeping chamber and a grinding module, the automatic beverage maker being characterized in that:

the grinding module comprises a supporting seat installed at an end of the main body of the beverage making mechanism, the supporting seat having an end formed as a receiving portion having a predetermined area, the receiving portion having a surface formed with a discharge opening, a limit switch being assembled at an outer portion of the supporting seat, a connecting element being coupled to an upper end of the supporting seat for allowing a containing unit containing a raw material of a hot drink to be stably screwed in place, a power motor being assembled at a lower end of the main body of the beverage making mechanism and having a protruding shaft coupled with a lower grinding element, a base plate being screwed into the connecting element and having an end coupled with an upper grinding element above the lower grinding element, the base plate having an upper section fitted with a container body, an anti-block element being installed in the container body, the container body having an upper end covered by a lid, wherein the raw material of the hot drink is placed in the container body and, upon activation of the power motor, is ground into powder by the upper and lower grinding elements; and the powder thus formed for making the hot drink is carried by a translational transport module into the steeping chamber, the translational transport module comprising a guide tube fitted to the receiving portion of the supporting seat installed on the main body of the beverage making mechanism, the guide tube having a bottom assembled with an arcuate rack seat and a distal end formed with a through hole fastened with a transparent window, the arcuate rack seat being driven by a gear coupled to a shaft of another power motor assembled to the main body of the beverage making mechanism such that the guide tube is driven in unison to rotate along the supporting seat, the guide tube, when rotated to an upper end of the steeping chamber, pushing aside an inlet cover at the upper end of the steeping chamber so that the guide tube has an end corresponding in position to the discharge opening of the supporting seat and introduces the powder for making the hot drink into an inlet of the steeping chamber, hot boiled water being guided from the internal water tank to drip into the powder in the steeping chamber for making the hot drink, thus forming a convenient hot drink making mechanism.

2. The automatic beverage maker of claim 1, wherein a top lid seat is coupled to a top of the main body of the beverage making mechanism, the top lid seat being formed with a plurality of through holes each having a predetermined area, the top lid seat having an end pivotally provided with a top lid having a bottom assembled with a guide chute, the guide chute being configured to guide hot boiled water out of the internal water tank at a side of the main body of the beverage making mechanism, a guide chute cover being movably coupled to an end of a connecting element pivotally provided at a lower end of the top lid, the guide chute having an end formed with an inlet tube section and an opposite end extended downward with an outlet tube section, the guide chute being coupled with the guide chute cover as one piece, a steam outlet being assembled to the guide chute cover and corresponding in position to the outlet tube section of the guide chute; and during use, the inlet tube section at the end of the guide chute assembled to the top lid is connected with a hot boiled water outlet extended from an upper end of the internal water tank of the beverage making mechanism so that hot boiled water is introduced through the outlet tube section of the guide chute into a corresponding water inlet of the steeping chamber to make the hot drink; and upon lifting up the top lid, the guide chute is driven accordingly to disengage from the hot water outlet at the upper end of the internal water tank of the beverage making mechanism.

3. The automatic beverage maker of claim 1, wherein after the inlet cover at the upper end of the steeping chamber assembled to the main body of the beverage making mechanism is pushed aside by the guide tube so as to introduce the powder of the hot drink to be made, a torsion spring assembled to the inlet cover at the upper end of the steeping chamber exerts a restoring force to move the inlet cover back in place so that the inlet cover closes the inlet of steeping chamber again.

* * * * *